June 6, 1967   R. P. OGDEN ETAL   3,323,647
WELDING FLUX RECOVERY HOPPER WITH MAGNET
Filed Sept. 24, 1964   2 Sheets-Sheet 1

INVENTORS
RALPH P. OGDEN
OLIVER W. LAW
BY
*Mann, Brown, + McWilliams*
ATTORNEYS

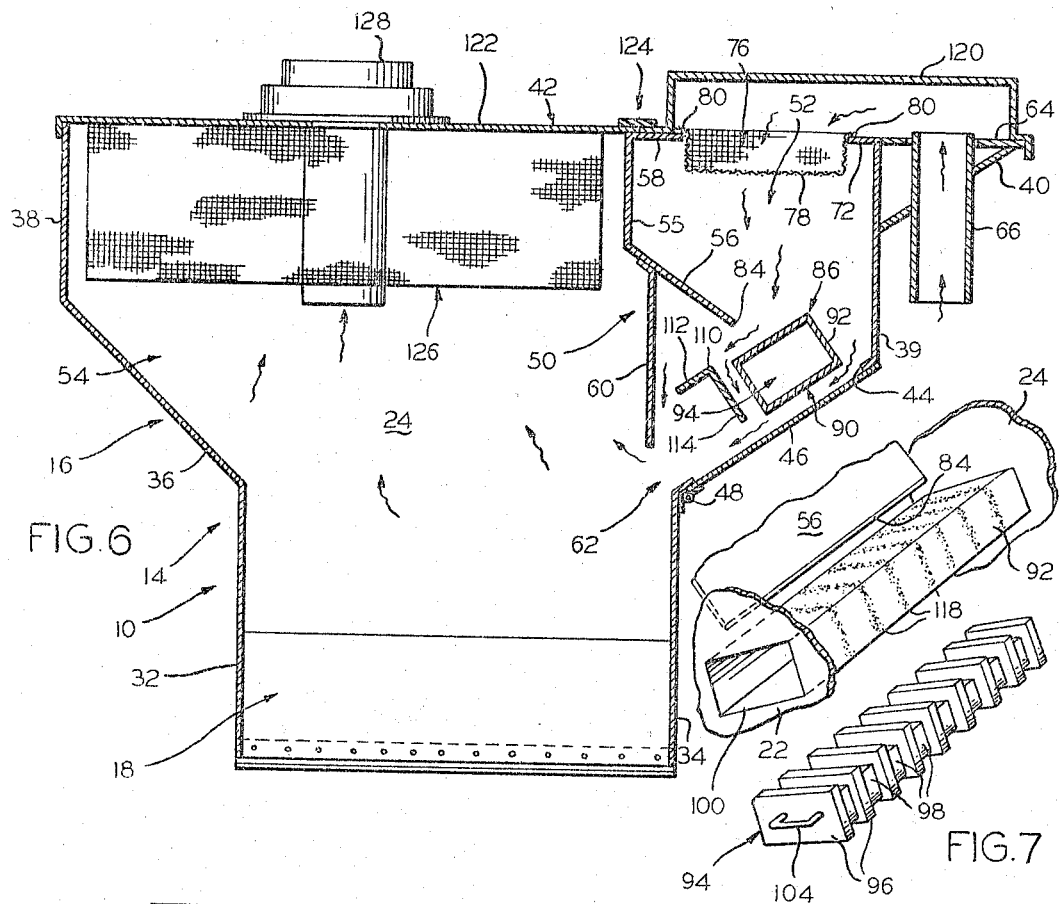
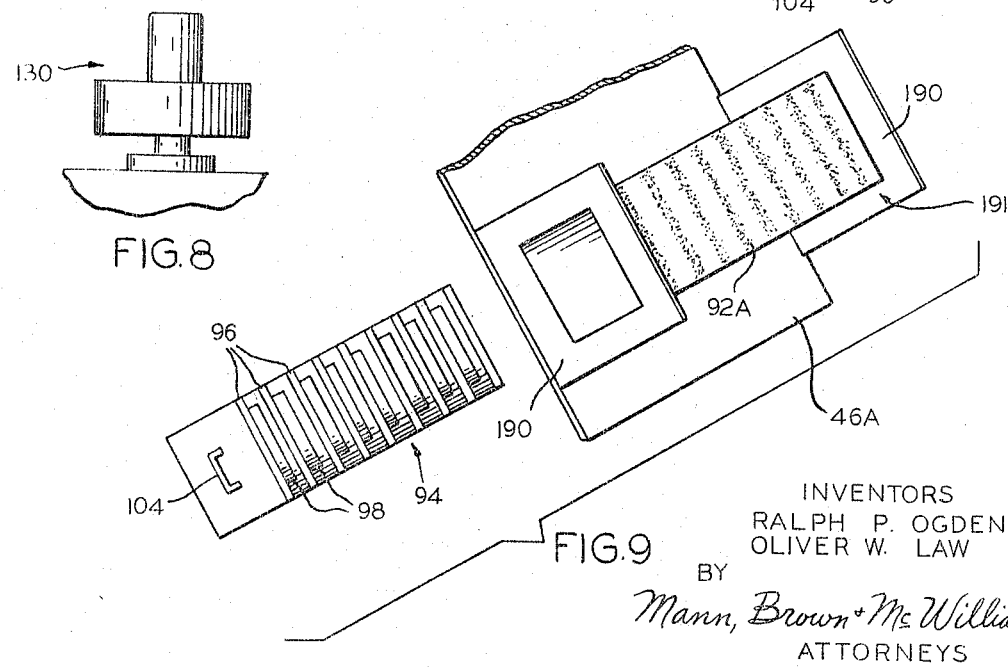
INVENTORS
RALPH P. OGDEN
OLIVER W. LAW
BY
Mann, Brown + McWilliams
ATTORNEYS

United States Patent Office 3,323,647
Patented June 6, 1967

3,323,647
WELDING FLUX RECOVERY HOPPER
WITH MAGNET
Ralph P. Ogden, 2 Ruth St., Hammond, Ind. 46320,
and Oliver W. Law, Cedar Lake, Ind. 46303
Filed Sept. 24, 1964, Ser. No. 399,032
9 Claims. (Cl. 209—223)

This invention relates to a device for recovering welding flux, and more particularly, to a vacuum operated hopper arrangement for use in connection with welding machines which returns the unused welding flux to the same container from which it passed on being fed into the welding zone.

When flux is used in a welding operation, a part of the flux is melted, but a substantial part stays on the surface of the weld in an unmelted condition. Actually, only about one-quarter of the flux employed in the welding operation is used up by the welding process, so it has become a standard practice to try and recover as much of the flux as possible for re-use.

Heretofore, flux recovery arrangements ordinarily have involved the use of a vacuum system to pick up the flux and deposit it in a container which is separate from the welding machine and ordinarily is in the form of a convenient box or the like of sufficient size to hold the flux that is picked up after the welding operation has been completed.

This container is then manually carried to the welding machine and the contents dumped into the flux hopper of the welding machine.

Such manual handling of the recovered flux is time consuming and inefficient, and furthermore, does not take into account that quite a few impurities are picked up by the flux retrievable process in the form of magnetizable particles (both metallic and non-metallic) known to the industry as "tramp" metal.

A principal object of this invention is to provide a flux recovery device that returns the flux to the welding machine hopper from which it was originally fed to the welding zone.

Another principal object of this invention is to provide a flux recovery device that may be applied as an insert to the standard type of welding machine flux hopper to provide standard welding machines with a flux recovery system for effecting return of the flux to the hopper.

Still another principal object of this invention is to provide a flux recovery device that eliminates the tramp metal from the recovered flux and avoids contamination of the flux as well as the device itself when the tramp metal itself is removed from the flux recovery device.

Other objects of the invention are to provide a vacuum type flux recovery system insert hopper structure unit for application to standard welding machine flux hoppers, to provide improved flux discharge control valve arrangements for such units, and to provide a flux recovery device that is economical of manufacture, convenient in use, and adapted for utilization in a wide variety of welding operations.

Other objects, uses and advantages will be obvious or become apparent from a consideration of the following detailed description and the application drawings.

In the drawings:

FIGURE 6 is a diagrammatic cross-sectional view substantially along line 6—6 of FIGURE 1;

FIGURE 7 is a fragmental perspective view showing the housing for the tramp metal removing magnet device of this invention, with the magnet device displaced from its housing;

FIGURE 8 is a fragmental elevational view of the top portion of the device shown in FIGURE 1, illustrating a modified form of the invention; and FIGURE 9 is a fragmental perspective view illustrating a modified way of mounting the tramp metal removing device in the device of FIGURE 1.

However, it should be understood that the specific drawing illustrations supplied are provided to comply with the requirements of 35 U.S.C. 112, and that the invention may have other specific embodiments.

Figure 1:
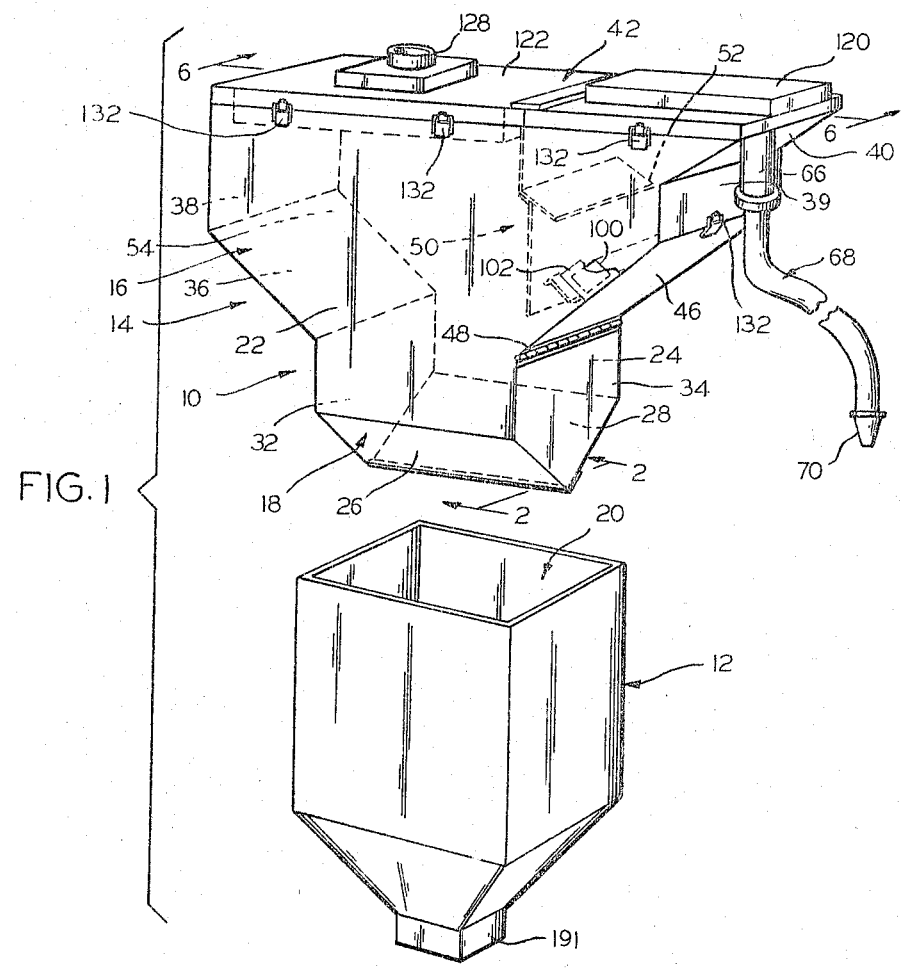
FIGURE 1 is a diagrammatic perspective view illustrating a specific embodiment of this invention about to be applied to a standard welding flux hopper of a welding machine.

Reference numeral 10 of FIGURES 1 and 6 generally indicates a specific embodiment of our invention adapted to be applied to a conventional welding flux hopper 12 of the general type that is carried by automatic and semi-automatic welding machines for the purpose of serving as a source of supply of welding flux for the welding head or torch.

The flux recovery device 10 comprises a hopper structure 14 shaped to define an enlarged upper funnelling portion 16 and a smaller lower funnelling portion 18, with the lower funnelling portion 18 being proportioned to substantially complement the interior space 20 of hopper 12 so as to seat in hopper 12, whereby the device 10 is supported on the welding machine by lower hopper funnelling portion 18 being received in the hopper 12.

Figure 2:
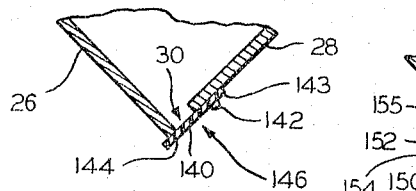
FIGURE 2 is a fragmental diagrammatic cross-sectional view substantially along line 2—2 of FIGURE 1.

Hopper structure 14 generally comprises a pair of substantially planar front and rear sheets 22 and 24 which at their lower ends are secured to a pair of inwardly inclined bottom sheets 26 and 28 that are spaced apart at the lower end of the hopper structure 14 to define hopper outlet 30 (see FIGURE 2).

The sheets 22, 24, 26, and 28 are joined together at the sides of the hopper structure 14 by end sheets 32, 34, 36, 38, 39 and 40, thereby defining an open top that is closed by cover structure 42 and an access port 44 at the side of the device 10 that is closed by a swinging panel 46 hinged in any suitable manner as at 48.

As indicated, the configuration of hopper structure 14 is such that the swinging panel 46 and the side panel 36 incline downwardly and inwardly toward the lower funnelling portion 18 to define the upper funnelling portion 16.

Hopper structure 14 includes the generally upright baffle structure 50 that extends crosswise of the hopper structure to define the hopper structure upper funnelling portion 16 into an air intake chamber 52 and an air discharge chamber 54.

The baffle structure 50 comprises a plate 55 formed to define an inclined portion 56 that inclines towards port 44 and an upper angled portion 58 at the level of the top of hopper structure 14. Affixed to inclined portion 56 is a depending plate or baffle 60 that extends crosswise of the hopper structure to define at its lower end a port 62 that extends transversely of the hopper structure 14 to provide communication between the chambers 52 and 54, as well as communication between the chamber 52 and the lower hopper funnelling portion 18.

As indicated in FIGURE 6, at chamber 52 the sidewall 39 extends to the top of hopper structure 14 and inclined sidewall 40 together with a top bracing plate 64 serves as a mounting support for intake conduit 66 to which is to be attached in any suitable manner a flexible hose or conduit 68 provided with a suitable intake nozzle 70. Hose or conduit 68 should have a length appropriate to the vacuum pickup work it is supposed to do in and around the welding zone.

Sidewall 39 is formed with an angled end portion 72 to define with end portion 58 of panel 55 and the front and rear walls 22 and 24 an air intake port 76 in which is removably positioned a coarse mesh screen element 78 that is provided with a dished shape and laterally extending top edges 80 to sit in place in port 76 in the manner indicated in FIGURE 6. Screen element 78 rests in the position shown in FIGURE 6 during normal operation, and is removed from time to time to dump accumulated debris.

The lower edge 84 of panel 55 defines with the swinging panel 46 an air confluence portion 86 in which is positioned the novel tramp metal removing magnet device 90.

The magnet device 90 comprises a tubular member 92 formed from a suitable non-magnetic and magnetic flux transparent material such as brass, which is fixed between the hopper structure front and rear walls 22 and 24 in the position indicated in FIGURE 6. Mounted in the tubular member 92 is a permanent magnet 94 in the form of an assembly of alternating sheets 96 of low carbon iron and ceramic magnet pieces 98 set in high coercive repulsion and bonded together in any suitable manner. Magnet 94 is of the type made by Arnold Engineering Company and sold as its Arnox 5 Ceramic Magnet.

Front sheet or panel 22 is perforated or formed with a port as at 100 (see FIGURES 1 and 7) to provide an opening for inserting and removing the magnet 94.

As indicated in FIGURE 1, the swinging panel 46 is provided with an appendage 102 that serves to close over the port 100 in the closed position of the panel 46.

Magnet 94 is provided with a suitable handle 104 to aid in inserting and withdrawing same to and from the tubular member 92.

Tubular member 92 and magnet 94 are shown to be quadrilateral in cross-sectional configuration, but they could be round insofar as the broad objectives of this invention are concerned.

Positioned downstream of magnet device 90 is an angle shaped baffle member 110 that defines baffle walls 112 and 114 for insuring air flow in the directions indicated by the arrows and deflecting tramp metal from port 62 when the magnet device 90 is cleaned.

The baffle arrangement of chamber 52 is arranged to insure good air flow around the exterior surfaces of tubular member 92 so that metal particles picked up on operation of the vacuum system will have good contact with the tubular member 92, the tramp metal accumulating on tubular member in the spaced row relationship indicated at 118 in FIGURE 7.

Cover structure 42 includes intake chamber cover portion 120 and air discharge chamber cover portion 122, and these portions are hinged together as at 124 in any suitable manner, as by a strip of Mylar or a suitable hinge. Cover portion 122 has secured thereto a suitable air filter structure 126 of any appropriate type and an adapter 128 for connecting thereto for mounting thereon a suitable blower device, such as that diagrammatically indicated at 130 in FIGURE 8. The blower may be located at a point removed from hopper structure 14, in which case a suitable conduit would be employed to connect the adapter 128 and the blower, or as indicated in FIGURE 8, the blower may be mounted directly on hopper structure 14.

The cover structure 42 and its cover portions 120 and 122 are formed to appropriately fit over the top of hopper structure 14 and cover structure 42 may be locked in place by being secured to the hopper front and rear walls 22 and 24 by means of suitable trunk locks 132 or the like. A similar trunk lock arrangement 132 may be employed to latch panel 46 in place.

The outlet 30 of hopper structure 14, in accordance with this invention, is closed by a resiliently flexible strip 140 secured in place to the sheet 28 by appropriate rivets or the like 142 applied along one edge 143 only of strip 140. Strip 140, which may be a strip of 50 durometer natural rubber, is positioned to have contact with the lower edge 144 of sheet 26.

The strip 140 forms a vacuum sensitive valve device 146 which closes off outlet 30 during the period that chamber 54 is connected to a source of vacuum. This permits flux to accumulate in the lower hopper funnelling portion 18 until the source of vacuum is disconnected or turned off, at which time the weight of the flux will open port or outlet 30 by the weight thereof bearing on the strip 140, which permits the flux to drop into hopper 12.

Figure 3:
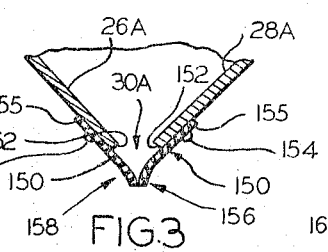
FIGURE 3 is similar to FIGURE 2 but illustrates a modified form of the invention.

In the alternate arrangement shown in FIGURE 3, the outlet port 30A is at the lower apex of the lower funnelling portion 18 and a pair of flexible strips 150 are secured in place along the hopper structure lower edges 152 as by appropriate rivets 154 extending along one edge 155 only of the respective strips 150. The strips 150 are proportioned so that when secured in place they engage each other below outlet 30A as indicated at 156 to define a pair of sealing lips that extend lengthwise of the outlet 30A, which in turn extends lengthwise of the lower hopper funnelling portion.

The sealing lip arrangement of FIGURE 3 defines a vacuum sensitive outlet valve 158 that operates in the same manner as the valve 148 of FIGURE 2, strips separating under the weight of the accumulated flux, on shutting off of the source of vacuum, to allow the flux to fall by gravity into hopper 12.

Figure 4:
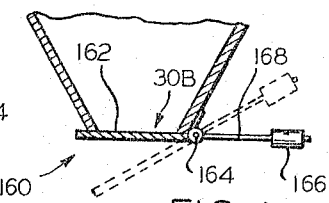
FIGURE 4 is similar to FIGURE 2 but illustrates an additional modified form of the invention.

Alternately, the lower funnelling portion outlet may be provided with the gravity and vacuum sensitive valve arrangement 160 of FIGURE 4, which comprises a lip in the form of a plate 162 pivoted as at 164 to close outlet 30B, with the plate 162 being provided with a counterweight 166 secured in any suitable manner to an arm 168 that is affixed to the plate 162. Gravity and vacuum sensitive valve arrangement 160 opens in the manner indicated in the dashed line position when an amount of welding flux equivalent to the bias provided by the counterweight 166 has accumulated on top of plate 162 and the vacuum source is shut off.

Figure 5:
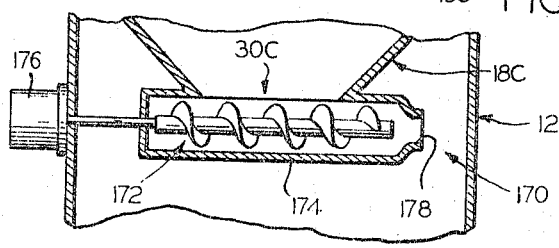
FIGURE 5 is similar to FIGURE 2, but illustrates yet another modification of the invention, with the flux recovery device shown permanently applied to the welding flux hopper.

FIGURE 5 illustrates a hopper structure outlet valve arrangement 170 which is intended to provide a continuous discharge of flux from the hopper insert structure into the welding machine hopper itself.

In accordance with this embodiment of the invention, the outlet valve device comprises a screw feed conveyor 172 journalled for rotation in a conduit structure 174 affixed to the hopper funnelling portion 18C below its outlet 30C. Feed screw 172 may be operated by a suitable motor 176 affixed to the hopper 12 and energized during operation of the vacuum system of this invention, whereby welding flux is continually fed through outlet 178 of conduit structure 174 into hopper 12 during operation of the flux recovery system comprising this invention.

In the modified arrangement of FIGURE 9, the magnet device 191 is mounted on the swinging panel 46A, with the magnet 94 being received in tubular member 92A that is secured to the panel 46A by spool-like flanges 190 affixed to each end of the tubular member 92A and to the swinging panel respectively, as by welding. Magnet 94 is received within tubular member 92A with the tubular member 92A having the same characteristics above specified, and the magnet device 191 is moved to its operating position, when panel 46A, which is arranged in the same manner as panel 46, is moved to its closed position equivalent to the showing of FIGURE 6.

It will be understood that suitable seals may be employed between the cover portions 120 and 122 and the hopper structure as may seem necessary or desirable.

In operation, the device 10 is inserted in the top of a welding flux hopper 12 of a welding machine to place the device 10 in its operative position. As already indicated, the lower hopper structure funnelling portion 18 complements the interior of the hopper 12, and consequently the hopper structure 14 at its lower portion nests within the top portion of hopper 12. Hopper 12 ordinarily is provided with a suitable flux flow control valve 191 and conduits leading to the welding heads supplied by the hopper 12 (not shown).

After the air discharge chamber 54 of hopper structure 14 is connected to a source of vacuum, such as by turning on blower 130, air is drawn into the air intake chamber 52 due to the vacuum conditions achieved inside the hopper structure 14. The vacuum sensitive valves 146 and 158 close when these vacuum conditions are created, as well as the gravity sensitive valve arrangement 160.

When the nozzle 70 of flexible conduit or hose 68 is applied to flux that is to be recovered, the flux is drawn through the flexible hose or conduit 70 through conduit 66 and into the air intake chamber 52 through screen element 78 and thence against the sides of magnet device tubular member 92. The air flow about the tubular member 92 is such that good contact is provided with substantially all of the flux passing into the air converging area 86 with the result that particles of magnetic material, such as the aforementioned tramp metal, will adhere to the tubular member 92, with the flux passing with the air flow through port 62 and into the hopper structure lower funnelling portion 18 to accumulate on top of the hopper structure outlet valve devices. The air passes through air filter structure 126 and out through cover portion 122 to and through the blower in the usual manner for such devices.

With regard to the vacuum sensitive valve arrangements 146 and 158, when the blower is shut off, the flux accumulated in the hopper structure lower funnelling portion 18 by its weight opens the valves involved so that the flux will fall into hopper 12.

In connection with the gravity sensitive valve device of FIGURE 4, during operation of the flux recovery system, when the flux accumulating on top of plate 162 has accumulated to the weight dictated by counterweight 166 and the vacuum source is shut off, the valve 160 opens to drop the accumulated flux in the hopper 12.

With regard to the valve arrangement 170 of FIGURE 5, the screw feed device operates continuously during operation of the flux recovery system to feed flux to hopper 12 through the port 178.

As a considerable amount of tramp metal is picked up during the flux recovery process, it is occasionally necessary to clear the metal particles off the tubular members 92 and 92A. In accordance with this invention, this is readily done merely by withdrawing the magnet 94, after the panels 46 and 46A have been opened, so that the metal particles will then drop free of the respective tubular members 92 and 92A and out of the hopper structure through the port or opening 44. The inclined wall 114 of baffle plate 110 insures that metal particles on the adjacent upwardly facing side of the member 92 in the embodiment of FIGURES 1–8 will not fall through port 62, and it will also be noted that panels 46 and 46A provide inclined chutes for guiding released tramp metal away from port 44.

It is to be noted that in the embodiment of FIGURE 9, the flanges 190 prevent the metal particles from falling and lodging onto the magnet 94 when it is withdrawn from the tubular member 92A (member 92 is open at both ends in this embodiment so that magnet 94 could be withdrawn from either end of the member 92A).

The same effect is had in the embodiments of FIGURES 2–8 as the front wall 22 and its point of connection to the tube 92 serves the same purpose.

It will therefore be seen that we have provided a highly simplified and effective device for effecting welding flux recovery. Not only does our device return the flux to the hopper from which it passes to the welding head, but it also effectively removes tramp metal from the flux so that the recovered flux has substantially the same quality as when it was originally used.

Moreover, the tramp metal removing device of our invention insures ready removal of the tramp metal particles without contamination of the flux or requiring periodic cleaning of the magnet.

While hopper structure 14 is disclosed as being shaped to be mounted inside flux hopper 12, hopper structure 14 alternately may be shaped to rest on top of or over hopper 12, as will be immediately apparent to those skilled in the art.

The flux recovery arrangement herein disclosed is an improvement over that disclosed in copending application Ser. No. 323,820, filed Nov. 14, 1963, the entire disclosure of which is incorporated herein by this reference. Said pending application discloses a specific welding hopper arrangement to whic hthe flux recovery device of this application may be readily applied.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. A welding flux recovery device for welding machines and adapted to fit into welding machine hoppers, said device comprising:
    a hopper structure including a lower funnelling portion defining an outlet and proportioned to be received within the upper portion of a welding machine hopper,
    said hopper structure including a generally upright baffle structure mounted in the upper portion thereof and extending crosswise thereof to define said hopper structure upper portion into an air intake chamber and an air discharge chamber,
    said baffle structure and said hopper structure defining a port at the base of said intake chamber that communicates with said air discharge chamber and said funnelling portion,
    means for connecting said air discharge chamber to a source of vacuum,
    conduit means for conveying flux laden air under the motivation of the source of vacuum to said air intake chamber,
    magnet means mounted in said intake chamber upstream of said port and extending crosswise of said intake chamber,
    valve means for controlling the discharge from said outlet of the flux that is received in said funnelling portion,
    said magnet means comprising:
    a tubular member formed from a non-magnetic material that is transparent to magnetic lines of force,
    and a magnet device removably mounted in said tubular member,
    said tubular member at one end thereof being open to receive said magnet device,
    said magnet means at said one end of said tubular member including dam means thereabout for precluding magnetic particles from following said magnet device on removal of said magnet device from said tubular member through said one end thereof,
    said tubular member being positioned within said intake chamber to define air flow paths on either side thereof,
    with the portions of said baffle structure and said hopper structure that define said intake chamber being formed to define an intake chamber funnelling portion,
said tubular member being positioned in said intake chamber funnelling portion.

2. The flux recovery device set forth in claim 1 wherein:
said intake chamber funnelling portion is above said hopper structure funnelling portion,
said hopper structure adjacent and below said tubular member defining a swinging panel member through which magnetic particles may be discharged from said hopper structure by gravity on removal of said magnet device from said tubular member.

3. The flux recovery device set forth in claim 2 wherein:
said panel member has secured thereto a tab portion that overlies said tubular member open end in the closed position of said panel member.

4. The flux recovery device set forth in claim 2 wherein:
said tubular member is secured to said panel member in spaced relation therefrom,
said dam means comprising a flange in circumambient relation about said one end of said tubular member.

5. A welding flux recovery device for welding machines and adapted to fit into welding machine hoppers, said device comprising:
a hopper structure including a lower funnelling portion defining an outlet and proportioned to be received within the upper portion of a welding machine hopper,
said hopper structure including a generally upright baffle structure mounted in the upper portion thereof and extending crosswise thereof to define said hopper structure upper portion into an air intake chamber and an air discharge chamber,
said baffle structure and said hopper structure defining a port at the base of said intake chamber that communicates with said air discharge chamber and said funnelling portion,
means for connecting said air discharge chamber to a source of vacuum,
conduit means for conveying flux laden air under the motivation of the source of vacuum to said air intake chamber,
valve means for controlling the discharge from said outlet of the flux that is received in said funnelling portion,
magnet means mounted in said intake chamber upstream of said port and extending crosswise of said intake chamber,
said magnet means comprising:
a tubular member formed from a non-magnetic material that is transparent to magnetic lines of force,
and a magnet device removably mounted in said tubular member,
said tubular member at one end thereof being open to receive said magnet device,
said magnet means at said one end of said tubular member including dam means thereabout for precluding magnetic particles from following said magnet device on removal of said magnet device from said tubular member through said one end thereof,
said tubular member being positioned within said intake chamber to define air flow paths on either side thereof,
with the portions of said baffle structure and said hopper structure that define said intake chamber being formed to define an intake chamber funnelling portion,
said tubular member being positioned in said intake chamber funnelling portion,
said hopper structure funnelling portion having a quadrilateral transverse cross-sectional configuration and said outlet thereof defining an elongated rectilinear opening extending substantially across the length of said hopper structure funnelling portion,
said valve means comprising vacuum sensitive lip means positioned over said outlet opening with a portion thereof free to deflect away from said outlet opening under the weight of flux accumulating in said hopper structure funnelling portion,
said lip means being pressed against said outlet by air atmosphere pressure to close said outlet when said discharge chamber is connected to said source of vacuum.

6. The flux recovery device set forth in claim 5 wherein:
said lip means comprises a single strip of flexible material secured to the exterior of said hopper structure along one edge of said outlet.

7. The flux recovery device set forth in claim 5 wherein:
said lip means comprises a pair of strips of flexible material secured to the exterior of said hopper structure along either edge of said outlet and engaging each other to close said outlet opening when said discharge chamber is connected to said source of vacuum.

8. The flux recovery device set forth in claim 5 wherein:
said lip means comprises a valve plate pivotally secured to said hopper structure and positioned to overlie said outlet to close off said outlet opening against flux flow from said hopper structure,
and means for biasing said valve plate toward its said outlet closing position,
said biasing means having a biasing action proportioned to be overcome by a predetermined weight of flux resting thereagainst to permit the flux to then drop through said outlet opening when said source of vacuum is disconnected.

9. A welding flux recovery device for welding machines, said device comprising:
a hopper structure including a lower funnelling portion defining an outlet,
said hopper structure including a generally upright baffle structure mounted in the upper portion thereof and extending crosswise thereof to define said hopper structure upper portion into an air intake chamber and an air discharge chamber,
said baffle structure and said hopper structure defining a port at the base of said intake chamber that communicates with said air discharge chamber and said funnelling portion,
means for connecting said air discharge chamber to a source of vacuum,
conduit means for conveying flux laden air under the motivation of the source of vacuum to said air intake chamber,
valve means for controlling the discharge from said outlet of the flux that is received in said funnelling portion,
magnet means mounted in said intake chamber upstream of said port and extending crosswise of said intake chamber,
said magnet means comprising:
a tubular member formed from a non-magnetic material that is transparent to magnetic lines of force,
and a magnet device removably mounted in said tubular member,
said tubular member at one end thereof being open to receive said magnet device,
said magnet means at said one end of said tubular member including dam means thereabout for precluding magnetic particles from following said magnet device on removal of said magnet device from said tubular member through said one end thereof,
said tubular member being positioned within said intake chamber to define air flow paths on either side thereof, with the portions of said baffle structure and said hopper structure that define said intake chamber being formed to define an intake chamber funnelling portion, said tubular member being positioned in said intake chamber funnelling portion.

References Cited

UNITED STATES PATENTS

| | | | |
|---|---|---|---|
| 572,548 | 12/1896 | Kelley | 209—258 X |
| 603,448 | 5/1898 | Lewis | 209—223 X |
| 2,269,538 | 1/1942 | Lewbers | 219—73 X |
| 2,464,628 | 3/1949 | Willard | 209—232 |
| 2,699,871 | 1/1955 | Stem | 209—223 |
| 2,766,360 | 10/1956 | Landis | 219—73 |
| 2,876,902 | 3/1959 | Varekamp | 210—223 |
| 3,116,237 | 12/1963 | Fontein | 209—242 |

HARRY B. THORNTON, *Primary Examiner.*

R. HALPER, *Assistant Examiner.*